United States Patent [19]

Muramatsu

[11] Patent Number: 5,128,707
[45] Date of Patent: Jul. 7, 1992

[54] REAR LIGHT DETECTING APPARATUS IN A CAMERA

[75] Inventor: Masaru Muramatsu, Kawasaki, Japan

[73] Assignee: Nikon Corporation, Tokyo, Japan

[21] Appl. No.: 655,350

[22] Filed: Feb. 14, 1991

[30] Foreign Application Priority Data

Feb. 19, 1990 [JP] Japan .................................. 2-37918

[51] Int. Cl.$^5$ ........................ G03B 7/28; G03B 13/36; G03B 15/03
[52] U.S. Cl. ................................. 354/408; 354/414; 354/432
[58] Field of Search ........................ 354/402, 406–408, 354/429–434, 413, 414, 419

[56] References Cited

U.S. PATENT DOCUMENTS

| | | | |
|---|---|---|---|
| 4,423,936 | 1/1984 | Johnson | 354/432 X |
| 4,664,495 | 5/1987 | Alyfuku et al. | 354/430 |
| 4,690,536 | 9/1987 | Nakai et al. | 354/402 |
| 4,862,206 | 8/1989 | Ootsuka et al. | 354/414 |
| 4,969,005 | 11/1990 | Tokunaga | 354/414 |
| 4,984,006 | 1/1991 | Ikemura et al. | 354/414 |
| 5,021,818 | 6/1991 | Satoh et al. | 354/429 |

Primary Examiner—W. B. Perkey
Attorney, Agent, or Firm—Shapiro and Shapiro

[57] ABSTRACT

A rear light detecting apparatus in a camera for detecting whether an object is in rear light comprises a center portion light meter for detecting the brightness of an object lying in the central area of the photographing picture plane, a peripheral portion light meter for detecting the brightness of an object lying in the peripheral area of the central area, a first rear light discriminator for judging on the basis of the result of the detection by the two light meters whether the object lying in the central area is in a rear light state, a focus detector for detecting the focuses of a plurality of objects lying in at least a predetermined detection area within the central area of the picture plane from a pair of object images formed on an image sensor, an object selector for selecting a main object on the basis of the result of the detection by the focus detector, a second rear light discriminator for judging from the outputs of the image sensor which correspond to the selected main object and the other objects whether the main object is in a rear light state, and a controller outputting a light emission signal for causing an electronic flash device to emit light during photographing when at least one of the first and second rear light discriminators is judged to be in a rear light state.

4 Claims, 5 Drawing Sheets

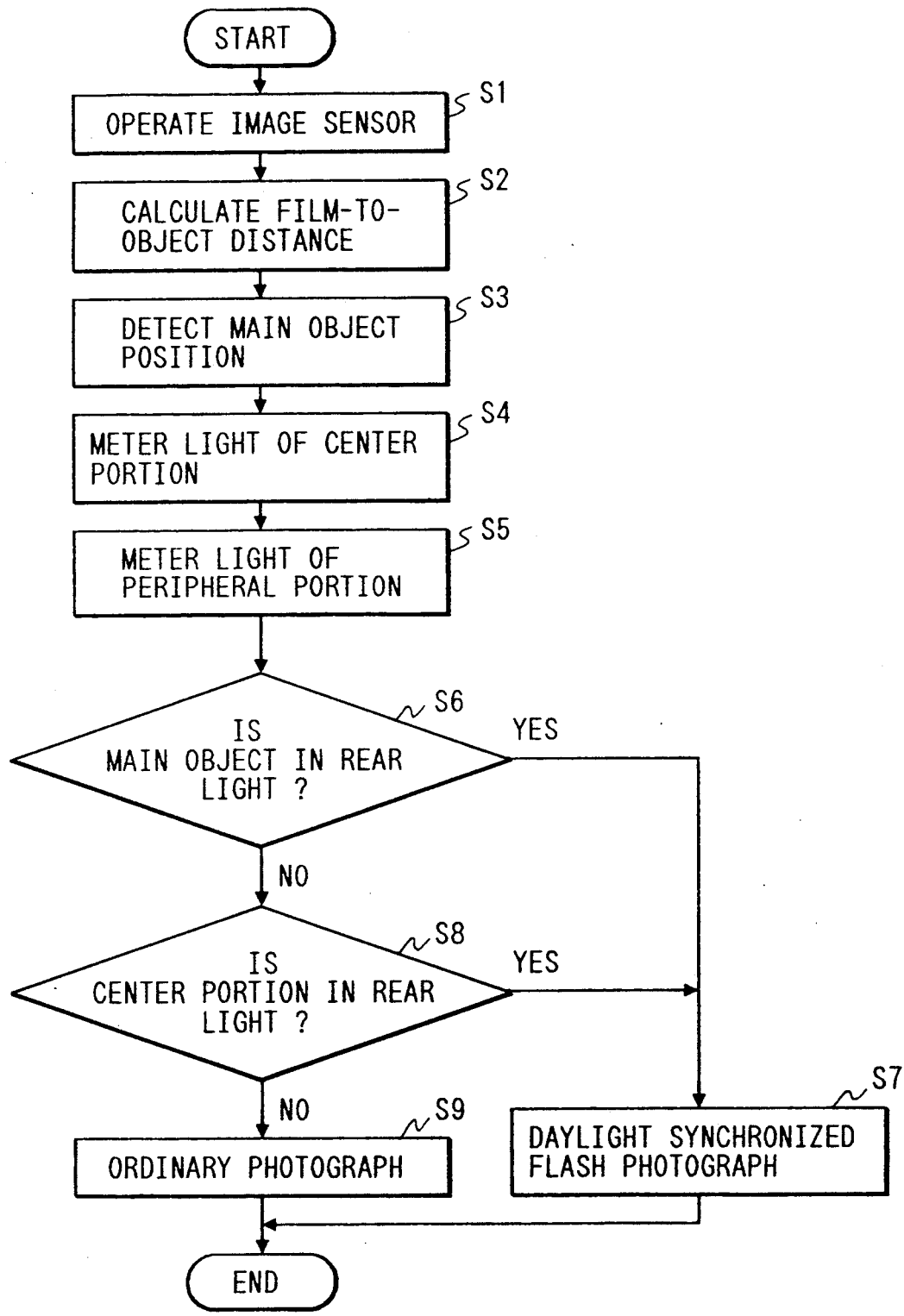

REAR LIGHT DETECTING APPARATUS IN A CAMERA

BACKGROUND OF THE INVENTION

1. Field of the Invention

This invention relates to a rear light detecting apparatus in a camera for detecting whether an object is in rear light.

2. Related Background Art

There is known a camera which automatically accomplishes daylight synchronized flash photographing. That is, this camera detects the brightness of an object lying in the central area of the photographing picture plane and the brightness of an object lying in the peripheral area of the central area, and judges the object in the central area to be in a rear light state when the brightness of the object in the central area is lower by a predetermined value or greater than the brightness of the object in the peripheral area, and causes an electronic flash device to emit light during photographing to thereby effect daylight synchronized flash photographing. According to this, failure such as the object in the central area being defaced in flack due to under-exposure is prevented.

There is also known a camera in which when the object is judged to be in rear light, the exposure compensation on the over side is effected to prevent a photograph of the under-exposure.

However, in the systems as described above, when the size of the main object in the central area of the picture plane is very small relative to the size of the central area, the brightness difference between the central area and the peripheral area becomes small and therefore, there is a case where even if the object is in rear light, the object cannot be judged to be in rear light and daylight synchronized flash photographing or exposure compensation is not effected, and in such a case, the main object will be of under-exposure.

SUMMARY OF THE INVENTION

It is an object of the present invention to enable rear light detection to be accurately accomplished even when the main object is very small.

Describing with reference to FIG. 1A of the accompanying drawings, the present invention is applied to a rear light detecting apparatus in a camera which is provided with a center portion light meter 101 for detecting the brightness of an object lying in the central area of the photographing picture plane, a peripheral portion light meter 102 for detecting the brightness of an object lying in the peripheral area of the central area, a first rear light discriminator 103 for judging on the basis of the result of the detection by the two light meters 101 and 102 whether the object lying in the central area is in a rear light state, and a controller 104 outputting, when said object is judged to be in rear light state, a light emission signal for causing an electronic flash device to emit light during photographing.

The rear light detecting apparatus is further provided with a focus detector 106 for detecting the focuses of a plurality of objects lying in at least a predetermined detection area within the central area of the picture plane from a pair of object images formed on an image sensor 105, an object selector 107 for selecting the main object on the basis of the result of the detection by the focus detector 106, and a second rear light discriminator 108 for judging from image sensor outputs corresponding to the selected main object and the other objects whether the main object is in a rear light state, and achieves the above-described technical task by constructing the controller 104 as follows.

The controller 104 outputs said light emission signal when at least one of the first and second rear light discriminators 103 and 108 judges the main object to be in a rear light state.

Also, describing with reference to FIG. 1B of the accompanying drawings, the present invention is applied to a rear light detecting apparatus in a camera which is provided with said center portion light meter 101, said peripheral portion light meter 102, a calculator 201 for calculating the exposure value during photographing from the result of the detection by said light meters 101 and 102, said first rear light discriminator 103, and an exposure compensator 202 for applying the compensation of the over side to the exposure value calculated by the calculator 201 when the main object is judged to be in a rear light state.

The rear light detecting apparatus is further provided with said focus detector 106, said object selector 107 and said second rear light discriminator 108, and achieves the above-described technical task by constructing said exposure compensator 202 as follows.

The exposure compensator 202 applies the compensation of said over side when at least one of the first and second rear light discriminators 103 and 108 judges the main object to be in a rear light state.

Also, the predetermined detection area in which the focus detector 106 effects focus detection may extend into the peripheral area, in addition to the central area of the picture plane.

In FIG. 1A, the focus detector 106 detects the focuses of a plurality of objects lying in at least the predetermined detection area within the central area of the picture plane from a pair of object images formed on the image sensor 105, and the object selector 107 selects the main object on the basis of the result of the detection. The second rear light discriminator 108 judges from image sensor outputs corresponding to the selected main object and the other objects whether the main object is in a rear light state. The controller 104 outputs, when at least one of the first and second rear light discriminators 103 and 108 judges the main object to be in a rear light state, a light emission signal during photographing to thereby cause the electronic flash device to emit light. That is, it effects daylight synchronized flash photographing. According to this, when the main object in the central area of the picture plane is small and in a rear light state, the first rear light discriminator 103 judges the main object to be not in rear light, while the second rear light discriminator 108 judges the main object to be in a rear light state and therefore, daylight synchronized flash photographing is effected.

In FIG. 1B, the exposure compensator 202 applies the compensation of the over side to the exposure value calculated by the calculator 201 when at least one of the first and second rear light discriminators 103 and 108 judges the main object to be in a rear light state. According to this, as described above, even when the main object in the central area of the picture plane (which is in a rear light state) is small, the second rear light discriminator 108 judges the main object to be in a rear light state and therefore, exposure compensation is effected.

If the predetermined area in which focus detection is effected is designed to extend to the peripheral area as well, even if an object which is in a rear light state is not in the central area of the picture plane but in the peripheral area, rear light judgment is done by the second rear light discriminator 108 and daylight synchronized flash photographing or exposure compensation is effected.

BRIEF DESCRIPTION OF THE DRAWINGS

FIGS. 2 to 6 show an embodiment of the present invention,

FIG. 2 being a block diagram showing the general construction of a rear light detecting apparatus according to the present invention, FIG. 3 illustrating a focus detecting system and a light metering system, FIG. 4 showing the focus detection area and the light metering area on the photographing picture plane, FIG. 5 showing an example of the output of an image sensor, and FIG. 6 is a flow chart of the processing procedure.

DESCRIPTION OF THE PREFERRED EMBODIMENTS

An embodiment of the present invention will hereinafter be described with reference to FIGS. 2 to 6.

Figure 1A:
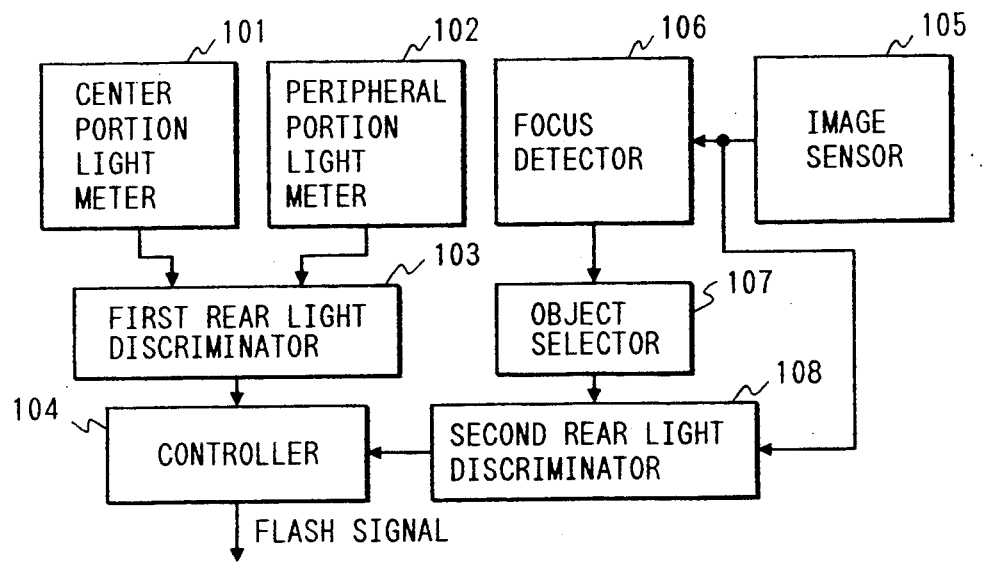
FIGS. 1A and 1B are block diagrams of a rear light detecting apparatus in a camera according to the present invention.
Figure 1B:
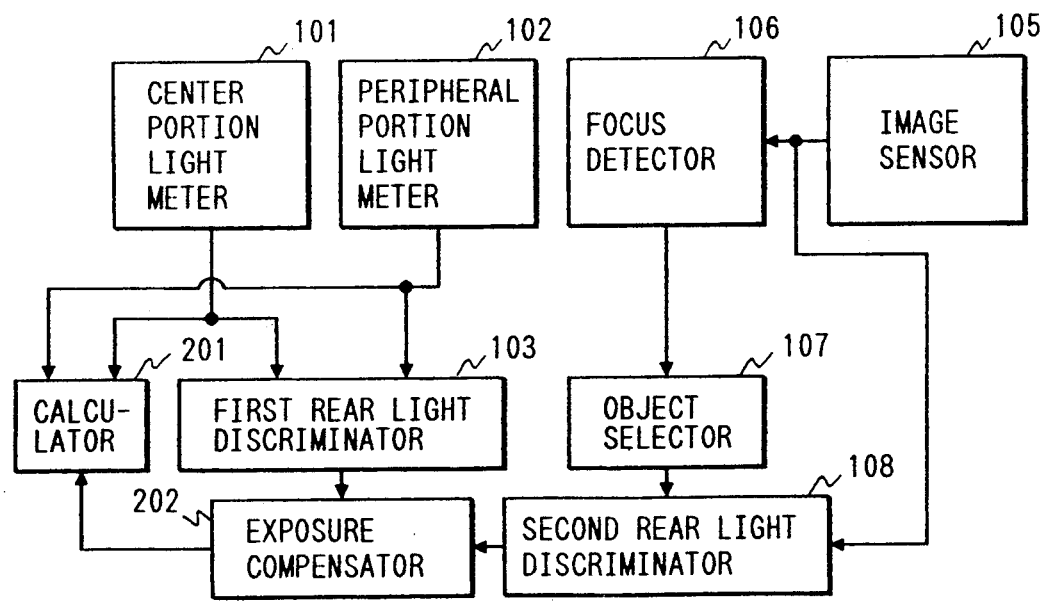
Figure 2:
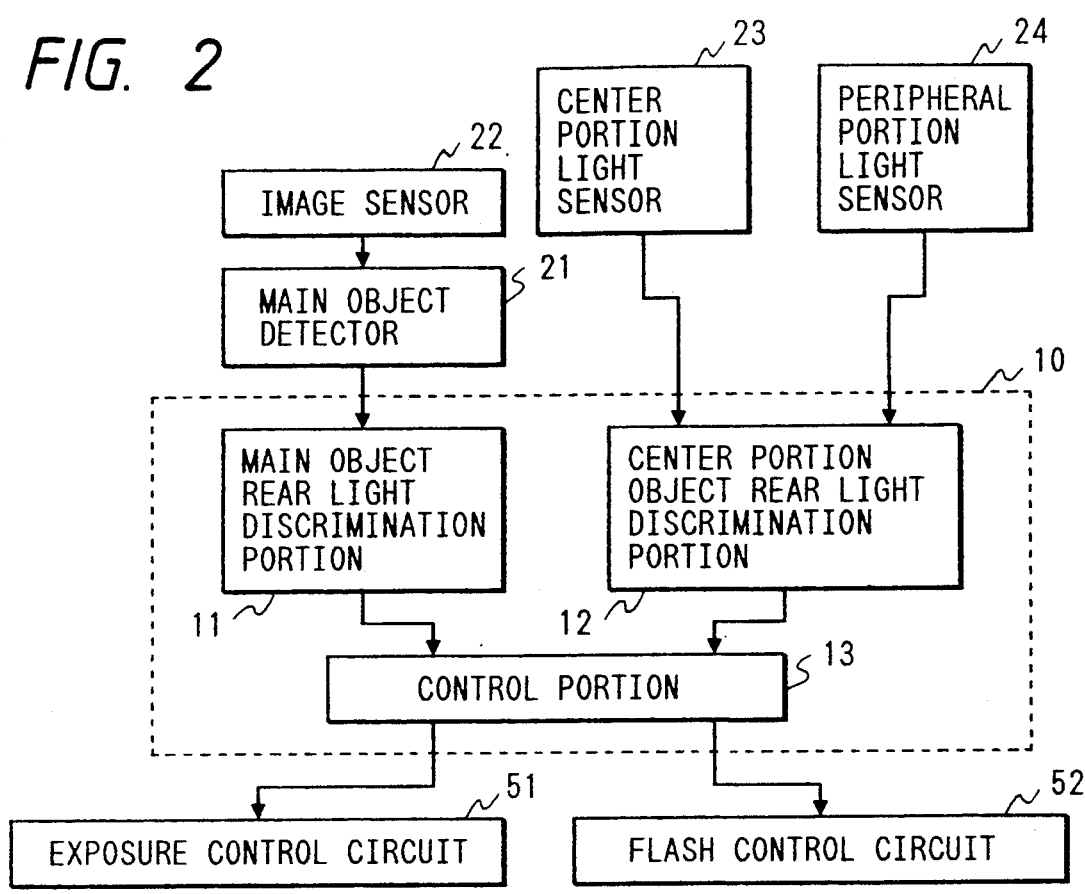

In FIG. 2 which shows the general construction of the embodiment, a control circuit 10 has a main object rear light discrimination portion 11, a center portion object rear light discrimination portion 12 and a control portion 13, and a main object detector 21 is connected to the main object rear light discrimination portion 11. The detection output of an image sensor 22 for focus detection may be input to the main object detector 21.

Figure 3:
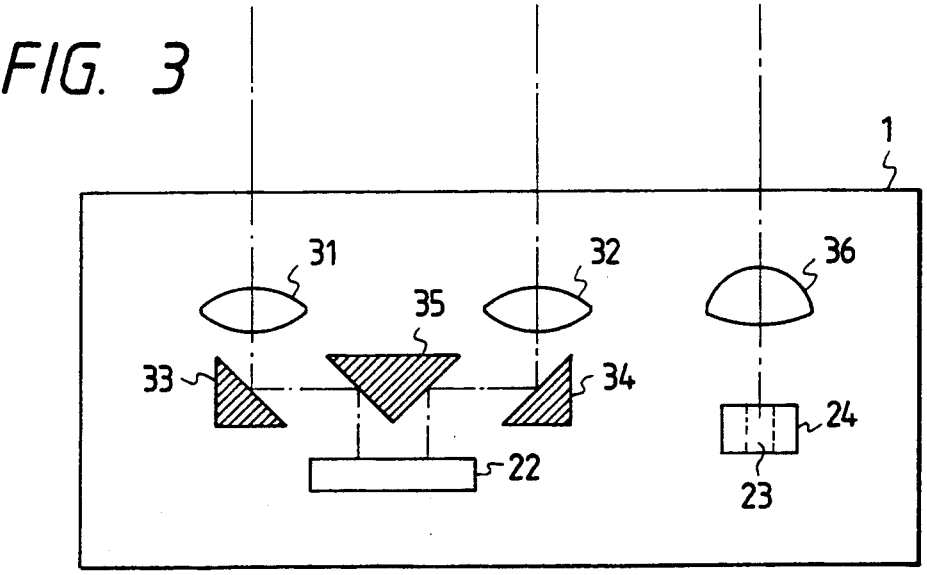

The image sensor 22 is disposed within a camera body 1, as shown in FIG. 3, and a pair of object lights passed through a pair of lenses 31 and 32 and reflected by reflecting mirrors 33, 34 and 35 are imaged on the image sensor 22, and the object images are output as a pair of image signals to the main object detector 21. These object lights are the reflected light from an object lying in a focus detection area 41 laterally extending substantially in the central portion of a photographing picture plane 40 shown in FIG. 4.

Figure 5:
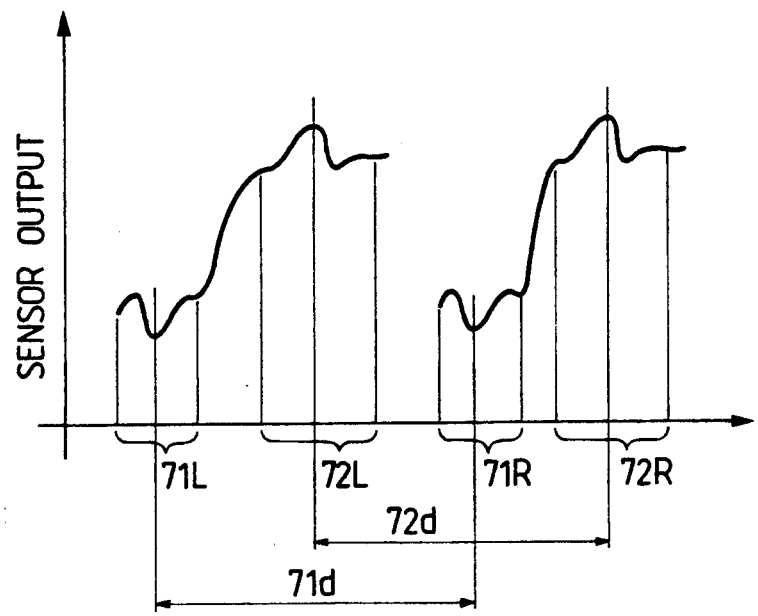

FIG. 5 shows an example of the sensor output, i.e., the image signal, when two object lights differing in object distance are projected onto the image sensor 22, and it is to be understood that one object is projected onto areas 71R and 71L on the image sensor 22 and the other objects are projected onto areas 72R and 72L on the image sensor 22. The main object detector 21 effects focus detection calculation on the basis of these image signals and calculates the distance to each object (the object distance) from the intervals 71d and 72d of the respective object images (this corresponds to focus detection, and judges, for example, the object at a shorter distance to be the main object, and inputs the position of the main object in the picture plane 40 to the main object rear light discrimination portion 11 of the control circuit 10. That is, it selects the main object.

The position of the main object and said image signals are also input to an AF circuit, not shown, and on the basis of these, the AF circuit calculates an amount of lens driving for focusing a photo-taking lens (not shown) on the main object.

Figure 4:
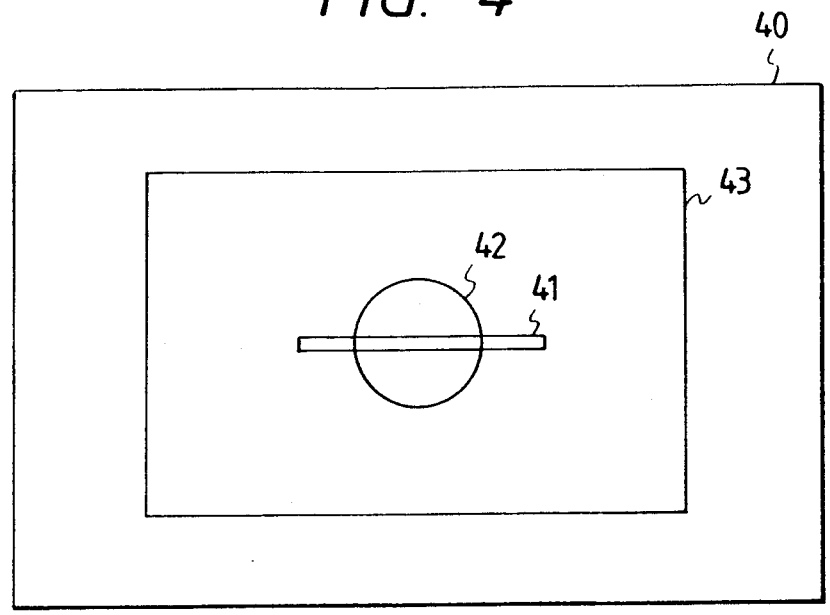

On the other hand, in FIG. 2, a center portion light sensor 23 and a peripheral portion light sensor 24 are connected to the center portion object rear light discrimination portion 12 in the control circuit 10. The center portion light sensor 23 receives the reflected light from an object lying in the circular central area 42 of the picture plane 40 (FIG. 3) through a lens 36 (FIG. 3), and detects the brightness of that object therefrom and inputs it to the center portion object rear light discrimination portion 12. The peripheral portion light sensor 24 likewise detects the brightness of an object lying in the peripheral are 43 of the central area 42 and inputs it to the center portion object rear light discrimination portion 12. Here, as shown in FIG. 4, the center portion of the above-mentioned focus detection area 41 lies in the central area 42, and the opposite end portions of the focus detection area 41 extend into the peripheral area 43.

Further, an exposure control circuit 51 and the flash control circuit 52 of an electronic flash device are connected to the control portion 13 of the control circuit 10. The exposure control circuit 51 drives a diaphragm and a shutter, not shown, by a command from the control portion 13 and effects photographing, and the flash control circuit 52 is responsive to a light emission signal output from the control portion to cause a light emitting tube, not shown, to emit light to illuminate the objects.

The procedure of the control by the control circuit 10 will now be described with reference to the flow chart of FIG. 6.

When for example, a release button, not shown, is half-depressed, this program starts and first, at a step S1, the image sensor 22 is operated through the main object detector 21. Thereby, the image sensor 22 inputs to the main object detector 21 the image of the object lying in the focus detection area 41 of FIG. 4 as an image signal. Subsequently, at a step S2, the control circuit 10 outputs an operation signal to the main object detector 21 and calculates the film-to-object distance of each object by the above-described focus detection calculation, and at a step S3, inputs to the main object rear light discrimination portion 11 the position in the picture plane 40 of the main object selected on the basis thereof. Assuming, for example, that in the example shown in FIG. 5, $71d > 72d$, the object projected onto the areas 71L and 71R is the object of a shorter distance, i.e., the main object. Also at this time, the output of the image sensor 22 is input to the main object rear light discrimination portion 11.

Then, at steps S4 and S5, the detection outputs of the center portion light sensor 23 and the peripheral portion light sensor 24, i.e., the brightnesses of the objects in the central area 42 and the peripheral area 43, are input to the center portion object rear light discrimination portion 12, and advance is made to a step S6. At the step S6, from the position of the main object input at the step S3 and the output of the image sensor 22 (the image signal), whether the main object is in a rear light state is judged by the main object rear light discrimination portion 11. That is, when as shown, for example, in FIG. 5, the output of the image sensor 22 corresponding to the position of the main object (the areas 71L, 71R) is lower by a predetermined value or more than the output of the sensor 22 corresponding to the position of the other object (the areas 72L, 72R) than the main object, the main object rear light discrimination portion 11 judges the main object to be in a rear light state, and in this case, advance is made to a step S7. The comparison between said sensor outputs may be done by the difference between the two sensor outputs, or may be done by the ratio therebetween.

At the step S7, daylight synchronized flash photographing is effected. That is, the result of the judgment that the main object is in a rear light state is input to the control portion 13, whereby the control portion 13 drives a diaphragm and a shutter, not shown, through the exposure control circuit 51, for example, with the full depression of the release button, and also outputs a light emission signal to the flash control circuit 52 of the electronic flash device. With the outputting of this light emission signal, the flash control circuit 52 causes a light emitting tube, not shown, to emit light and illuminate the object.

On the other hand, when the image sensor output corresponding to the position of the main object is not lower by a predetermined value or more than the sensor output corresponding to the position of the other object than the main object, at the step S6, the main object is judged to be not in a rear light state, and in this case, advance is made to a step S8.

At the step S8, whether the object in the central area 42 (regarded as the main object) is in a rear light state is judged from the brightnesses of the objects in the central area 42 and the peripheral area 43 input at the steps S4 and S5. That is, if the brightness of the object in the central area 42 is lower by a predetermined value or more than the brightness of the object in the peripheral area 43, the main object is judged to be in a rear light state and advance is made to the above-described step S7, and in the other case, the main object is judged to be not in a rear light state and advance is made to a step S9. At the step S9, ordinary photographing in which the electronic flash device is not caused to emit light is effect to thereby terminate the process. This rear light judgment may be done by the difference between the brightnesses of the objects in the areas 42 and 43, or may be done by the ratio therebetween.

According to the above-described procedure, whether the object in the central area 42 is in a rear light state is judged from the brightness of the object in the central area 42 and the brightness of the object in the peripheral area 43 (this will hereinafter be referred to as the judgment by the light sensor), and whether the main object is in a rear light state is judged from the outputs of the image sensor 22 which correspond to the main object and the other object (this will hereinafter be referred to as the judgment by the image sensor). Here, the judgment by the image sensor is not affected by the size (area) of the main object like the judgment by the light sensor because whether the main object is in a rear light state is judged from the height of the sensor output in the focus detection area 41, and judgment of rear light can be accurately effected even for small objects. If rear light is judged in at least one of the above-described two judgments, daylight synchronized flash photographing accompanied by the light emission of the electronic flash device is effected.

FIGS. 7A to 7D show the rear light judgment situations by the positions or the sizes of the main objects (figures) 81, and it is to be understood that each of the main objects 81 is in a rear light state.

Figure 7A:
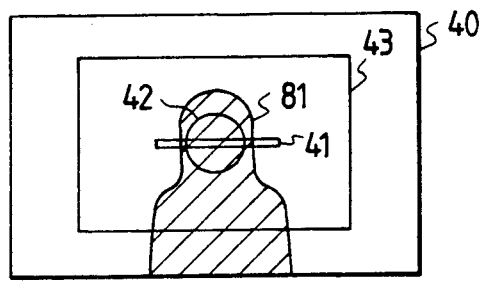
FIGS. 7A to 7D illustrate the rear light judgments in various objects

If as shown in FIG. 7A, the main object 81 is substantially at the center of the photographing picture plane and moreover is of a size large enough to fully cover the central area 42, both of the judgments by the light sensor and the image sensor are rear light judgments, whereby daylight synchronized flash photographing is effected.

Figure 7B:
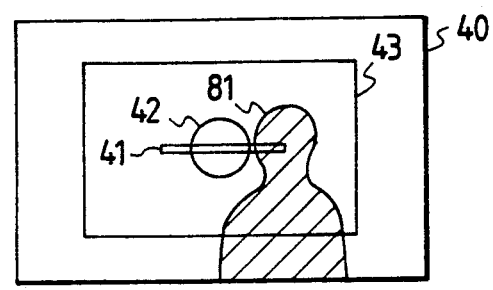

Also, if as shown in FIG. 7B, the main object 81 is at a position completely deviating from the central area 42 but falls on the end portion of the focus detection area, the judgment by the image sensor is rear light judgment (the judgment by the light sensor is non-rear light judgment) and again in this case, daylight synchronized flash photographing is effected. That is, in the present embodiment, the end portion of the image sensor 22 extends to the peripheral area and therefore, even if the main object is not in the central area 42, a rear light state can be judged.

Figure 7C:
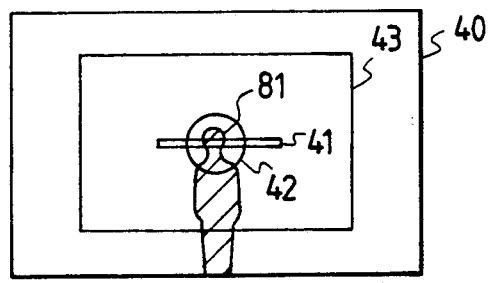

Further, even when as shown in FIG. 7C, the object lies in the central area 42 but the size thereof is small, the object falls on the focus detection area 41 and therefore, as in the case of FIG. 7B, the judgment by the light sensor is non-rear light judgment, but the judgment by the image sensor is rear light judgment, and daylight synchronized flash photographing is effected.

Figure 7D:
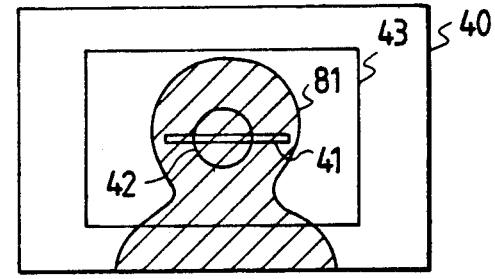

Furthermore, if as shown in FIG. 7D, the object is in the center portion and is large enough to fully cover the central area 42 and the focus detection area 41, the judgment by the image sensor is non-rear light judgment, but the judgment by the light sensor is rear light judgment and again in this case, daylight synchronized flash photographing is effected.

Thus, according to the present embodiment when the main object is in a rear light state, except a case where the object 81 lies extremely at a corner of the picture plane 40, rear light judgment becomes possible and daylight synchronized flash photographing is effected.

In the construction of the above-described embodiment, the center portion light sensor 23 constitutes the center portion light meter 101, the peripheral portion light sensor 24 constitutes the peripheral portion light meter 102, the center portion object rear light discrimination portion 12 constitutes the first rear light discriminator 103, the main object detector 21 constitutes the focus detector 106 and the object selector 107, the main object rear light discrimination portion 11 constitutes the second rear light discriminator 108, and the control portion 13 constitutes the controller 104.

Also, in the above-described embodiment, design is made such that daylight synchronized flash photographing is effected when rear light is judged, but alternatively, design may be made such that exposure compensation is effected instead of the daylight synchronized flash photographing. That is, if in a camera wherein the exposure value during photographing is calculated from the result of the detection by the light sensors 23 and 24, at least one of the judgments by the light sensors and the image sensor is rear light judgement, the compensation of the over side is applied to the calculated exposure value.

While the embodiment has been shown as an example in which the opposite end portions of the focus detection area 41 extend to the peripheral area 43, only one of the end portions may extend to the peripheral area 43, or the focus detection area 41 may be fully within the central area 42. Where the area 41 is thus designed to be fully within the central area 42, rear light judgment cannot be done if the main object 81 is not in the central area 42, but if the main object 81 is in the central area 42, the main object can be judged to be in a rear light state even though its size is small.

Further, description has been made of an outdoor light type focus detecting apparatus in which the object distance is found from the output of the image sensor 22, but the present invention may also be applied, for example, to a TTL automatic focus detecting apparatus which effects focus detection by the object light passed through a photo-taking lens.

Furthermore, the electronic flash device may be contained within the camera or may be attached to the exterior of the camera. Also, use is made of the image sensor 22 also for use for AF, but alternatively, provision may be made of an image sensor for exclusive use. However, the utilization of the existing image sensor for AF can achieve the simplification of the construction and a reduction in the number of parts and cost, as compared with the use of a sensor for exclusive use.

According to the present invention design is made such that whether the object in the central area is in a rear light state is judged from the brightnesses of the objects in the central area of the picture plane and the peripheral area thereof and whether the main object lying in the focus detection area within the central area is in a rear light state is judged from the output of the image sensor for focus detection and that if at least one of the two judgments is rear light judgment, daylight synchronized flash photographing is effected and therefore, even if the object in the central area is small, rear light judgment can be done reliably and daylight synchronized flash photographing is effected, whereby photographing can be accomplished reliably at proper exposure even if the main object is in a rear light state.

Also, according to the present invention, design is made such that if at least one of said two judgments is rear light judgment, the exposure during photographing is corrected to the over side and therefore, as described above, even if the object in the central area is small, rear light judgment can be done reliably, and by said correction, photographing can be accomplished reliably at proper exposure even if the main object is in a rear light state.

Further, particularly according to the present invention, design is made such that the focus detection area extends to the peripheral area and therefore, in addition to the above-described effects, even whether an object lying in the peripheral area is in a rear light state can e judged and thus, photographing at proper exposure becomes possible by daylight synchronized flash photographing or exposure compensation.

I claim:

1. A rear light detecting apparatus in a camera including:
   center portion light meter means for detecting the brightness of an object lying in the central area of the photographing picture plane,
   peripheral portion light meter means for detecting the brightness of a object lying in the peripheral area of said central area,
   first rear light discriminator means for judging on the basis of the result of the detection by said two light meter means whether the object lying in said central area is in a rear light state;
   focus detecting means for detecting the focuses of a plurality of objects lying in at least a predetermined area within said central area of the picture plane from a pair of object images formed on an image sensor;
   object selector means for selecting a main object on the basis of the result of the detection by said focus detecting means;
   second rear light discriminator means for judging from the outputs of said image sensor which correspond to said selected main object and the other objects whether said main object is in a rear light state; and
   control means outputting a light emission signal for causing a electronic flash device to emit light during photographing when at least one of said first and second rear light discriminator means is judged to be in a rear light state.

2. A rear light detecting apparatus according to claim 1, wherein said predetermined area in which said focus detecting means effects focus detection extends into said peripheral area in addition to said central are of the picture plane.

3. A rear light detecting apparatus in a camera including:
   center portion light meter means for detecting the brightness of an object lying in the central area of the photographing picture plane;
   peripheral portion light meter means for detecting the brightness of an object lying in the peripheral area of said central area;
   calculation means for calculating the exposure value during photographing from the result of the detection by said two light meter means;
   first rear light discriminator means for judging on the basis of the result of the detection by said two light meter means whether the object lying in said central area is in a rear light state;
   focus detecting means for detecting the focuses of a plurality of objects lying in at least a predetermined area within said central area of the picture plane from a pair of object images formed on an image sensor;
   object selector means for selecting a main object on the basis of the result of the detection by said focus detecting means;
   second rear light discriminator means for judging from the outputs of said image sensor which correspond to said selected main object and the other objects whether said main object is in a rear light state; and
   exposure compensator means for applying the compensation of the over side to the exposure value calculated by said calculation means when at least one of said first and second rear light discriminator means is judged to be in a rear light state.

4. A rear light detecting apparatus according to claim 3, wherein said predetermined area in which said focus detecting means effects focus detection extends into said peripheral area in addition to said central area of the picture plane.

* * * * *